United States Patent
Naghi

(10) Patent No.: US 6,422,944 B1
(45) Date of Patent: *Jul. 23, 2002

(54) PLUG-IN AMPLIFIED STEREO SOUND AND FORCE FEED BACK ACCESSORY FOR VIDEO GAME DEVICES AND METHOD OF USING SAME

(75) Inventor: David Naghi, Los Angeles, CA (US)

(73) Assignee: Technology Creations, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/679,719

(22) Filed: Oct. 4, 2000

Related U.S. Application Data

(63) Continuation-in-part of application No. 09/540,628, filed on Mar. 31, 2000, which is a continuation-in-part of application No. 09/205,660, filed on Dec. 2, 1998, now abandoned.

(51) Int. Cl.$^7$ ................................................. A63F 9/24
(52) U.S. Cl. ...................................................... 463/47
(58) Field of Search ............................. 463/47; 439/352

(56) References Cited

U.S. PATENT DOCUMENTS

| | | | |
|---|---|---|---|
| 5,217,295 A | * | 6/1993 | Tortola et al. ............... 362/109 |
| 5,225,760 A | | 7/1993 | Leiserson |
| 5,260,636 A | | 11/1993 | Leiserson et al. |
| D344,260 S | | 2/1994 | Leiserson et al. ........... D13/103 |
| D346,748 S | | 5/1994 | Leiserson et al. ........... D13/103 |
| 5,426,358 A | | 1/1995 | Leiserson et al. |
| 5,481,616 A | * | 1/1996 | Freadman .................... 381/90 |
| 5,506,488 A | | 4/1996 | Leiserson |
| 5,608,303 A | | 3/1997 | Leiserson |
| 5,643,087 A | | 7/1997 | Marcus et al. ................. 463/38 |
| 5,691,898 A | | 11/1997 | Rosenberg et al. ......... 364/190 |
| 5,897,437 A | | 4/1999 | Nishiumi et al. .............. 463/47 |
| 5,951,317 A | * | 9/1999 | Tracy et al. .................. 439/352 |
| 5,951,399 A | * | 9/1999 | Burrell et al. ................. 463/46 |
| 6,001,014 A | | 12/1999 | Ogata et al. ................... 463/37 |
| 6,004,134 A | | 12/1999 | Marcus et al. ................. 434/45 |
| 6,026,126 A | * | 2/2000 | Palett et al. ................. 379/454 |
| 6,135,450 A | * | 10/2000 | Huang et al. ............ 273/148 B |
| 6,147,674 A | * | 11/2000 | Rosenberg et al. ......... 345/157 |
| 6,163,711 A | * | 12/2000 | Juntunen et al. ............ 455/557 |

\* cited by examiner

*Primary Examiner*—Valencia Martin-Wallace
*Assistant Examiner*—Carmen D. White
(74) *Attorney, Agent, or Firm*—Procopio, Cory, Hargreaves & Savitch, LLP

(57) ABSTRACT

An accessory for a hand-held video game device having an external power supply outlet and a headphone outlet, including a case capable of forming a mechanical connection with the hand-held device, a rechargeable battery, a power jack electrically coupled to the rechargeable battery and adapted for insertion into the external power supply of the hand-held device for powering the device, an audio connector jack adapted for insertion into the headphone outlet of the hand-held device for receiving audio signals from the hand-held device, an amplified stereo speaker system adapted to be powered by the rechargeable battery and receive audio signals from the hand-held device through the audio connector jack when the audio connector jack is inserted into the headphone outlet, and a vibration mechanism electrically coupled to the rechargeable battery and adapted to cause movement sensations in the accessory, the vibration mechanism adapted to be actuated by the audio signals.

26 Claims, 3 Drawing Sheets

PLUG-IN AMPLIFIED STEREO SOUND AND FORCE FEED BACK ACCESSORY FOR VIDEO GAME DEVICES AND METHOD OF USING SAME

CROSS REFERENCE TO RELATED APPLICATIONS

This application is a continuation-in-part of U.S. Ser. No. 09/540,628, filed Mar. 31, 2000, which is a continuation-in-part of U.S. Ser. No. 09/205,660, filed Dec. 2, 1998, now abandoned.

FIELD OF THE INVENTION

The present invention relates to accessories for hand-held video game devices.

BACKGROUND OF THE INVENTION

One of the more popular hand-held video game devices today is the Nintendo® Game Boy® device. Several separate accessories are available for use with the Nintendo® Game Boy® device, including speakers that connect to the device through the headphone outlet, a force feed back accessory that creates a force feed back effect in the hand of the user in response to electrical back signals received from the Nintendo® device, and a rechargeable battery pack that is inserted into the existing battery compartment of the Game Boy® device for powering the device.

A problem with these accessories is that they are separate accessories and, often, only one of these accessories can be used at a time. If a user wants to take advantage of the features of a particular accessory, the user may have to remove a previously attached accessory and replace it with a new one, or add the additional accessory. Having to constantly switch back and forth between accessories is time-consuming, and increases wear and tear on associated adapters and contacts. Additionally, having to buy multiple accessories is expensive, and multiple accessories are more difficult to store and keep track of than a single accessory.

A need, therefore, exists for a single accessory for a hand-held video game device that provides a force feed back effect, amplified stereo sound, and a rechargeable battery pack.

SUMMARY OF THE INVENTION

A first aspect of the invention involves an accessory for a handheld video game device having an external power supply outlet and a headphone outlet. The accessory includes a case capable of forming a mechanical connection with the handheld video game device, a rechargeable battery, a power jack electrically coupled to the rechargeable battery and adapted for insertion into the external power supply outlet of the hand-held video game device for powering the hand-held video game device, an audio connector jack adapted for insertion into the headphone outlet of the hand-held device for receiving audio signals from the hand-held video game device, an amplified stereo speaker system adapted to be powered by the rechargeable battery and receive audio signals from the hand-held video game device through the audio connector jack when the audio connector jack is inserted into the headphone outlet, and a vibration mechanism electrically coupled to the rechargeable battery and adapted to cause a movement sensation in the accessory, the vibration mechanism adapted to be actuated by the audio signals.

A second aspect of this invention involves an accessory for a handheld video game device having a battery compartment with battery contacts, and a headphone outlet. The accessory includes a case capable of forming a mechanical connection with the handheld video game device, a rechargeable battery, at least one electrical contact electrically coupled to the rechargeable battery and adapted to come into contact with the battery contacts of the hand-held video game device for powering the hand-held video game device, an audio connector jack adapted for insertion into the headphone outlet of the hand-held device for receiving audio signals from the hand-held video game device, an amplified stereo speaker system adapted. to be powered by the rechargeable battery and receive audio signals from the hand-held video game device through the audio connector jack when the audio connector jack is inserted into the headphone outlet, and a vibration mechanism electrically coupled to the rechargeable battery and adapted to cause a movement sensation in the accessory, the vibration mechanism adapted to be actuated by the audio signals.

Implementations of the first and second aspects of the invention may include one or more of the following. At least one switch mechanism is adapted to allow a user of the accessory to turn on and turn off the vibration mechanism. A vibration control mechanism is adapted to allow a user of the accessory to control the vibration level of the vibration mechanism. At least one switch mechanism is adapted to allow a user of the accessory to turn on and turn off the amplified stereo speaker system. The accessory further includes a volume control mechanism adapted to allow a user of the accessory to control the volume level of the amplified stereo speaker system. The accessory may further include a motor and a weight driven by the motor that causes a vibration sensation in the accessory, or a solenoid and a weight connected to the solenoid such that when the solenoid is activated the weight is moved to cause a vibration sensation in the accessory. Moreover, the accessory may include a vibration mechanism that vibrates at a level proportionate to a characteristic of the audio signals, an external power supply outlet adapted for electrical communication with an external power source for charging the rechargeable battery, and a headphone outlet adapted to receive an audio connector jack of a pair of a headphone. Finally, the accessory may include an external ergonomically designed grip for improved control and comfort during game play, including a grip is made of a plastic material.

A third aspect of the invention is a method for connecting an accessory to a hand-held video game device, the accessory having an electronics-enclosing case, a power jack and an audio connector jack, and the device having an external power supply outlet and a headphone outlet. The method includes mechanically locking the accessory to the device, and inserting the power and the audio connector jacks of the accessory into the external power supply and the headphone outlets of the device, respectively, to secure electrical and audio connections between the accessory and the device.

A fourth aspect of the invention is a method for connecting an accessory to a hand-held video game device, the accessory having an electronics enclosing case, at least one electrical contact adapted to come into contact with a battery contact of the device, and an audio connector jack, and the device having an external power supply outlet and a headphone outlet. The method includes mechanically locking the accessory to the device, placing the battery contact of the device in electrical communication with the at least one electrical contact of the accessory, and inserting the audio connector jack of the accessory into the external power supply and the headphone outlets of the device, respectively, to secure the audio connection between the accessory and the device.

Other features and advantages of the invention will be evident from reading the following detailed description, which is intended to illustrate, but not limit, the invention.

DETAILED DESCRIPTION OF THE PREFERRED EMBODIMENTS

Figure 1:
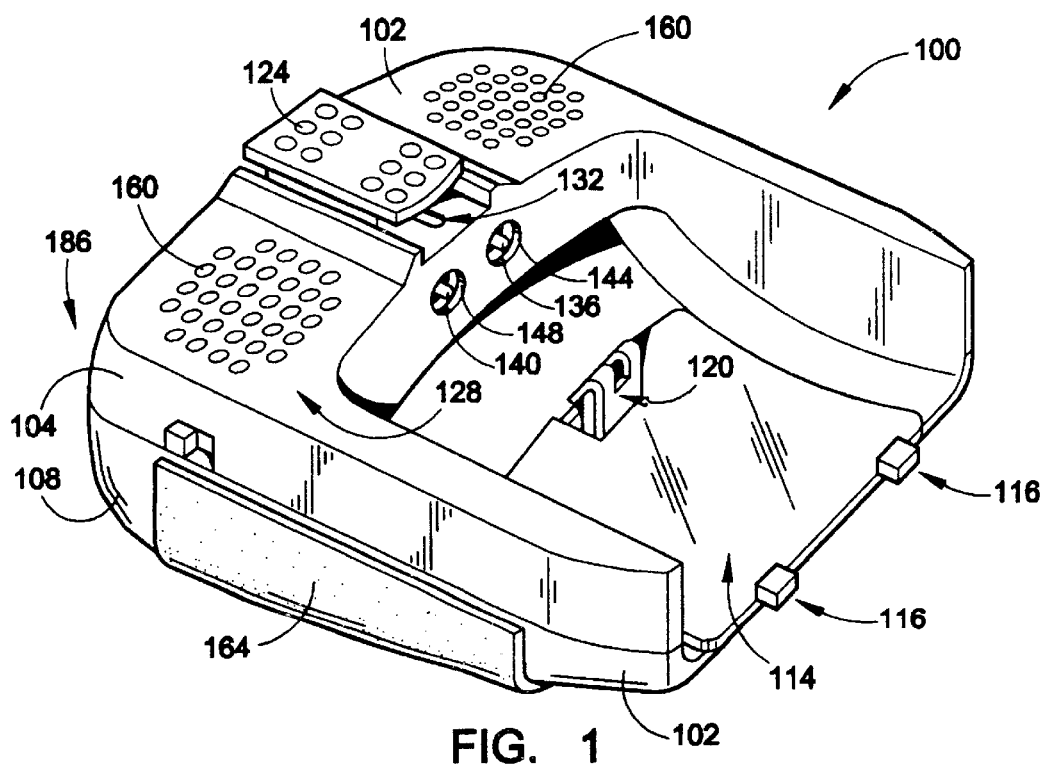
FIG. 1 is a perspective view of an embodiment of an accessory for a hand-held video game device.

With reference to FIG. 1, an embodiment of an accessory 100 for use with a hand-held video game device such as, but not by limitation, the NINTENDO® GAME BOY® hand-held video game device will now be described. The accessory 100 is adapted to be mechanically coupled to a lower portion of a hand-held video game device. The accessory 100 includes a case or housing 102 having a first member 104 and a second member 108. The case 102 houses accessory electronics to be described. The hand-held video game device preferably includes a battery compartment cover that covers a battery compartment in which a number of batteries can be inserted to provide power to the hand-held video game device during normal use. The battery compartment may include a pair of slots at a top portion of the battery compartment and a groove or slot located at a lower portion of the, battery compartment. The top portion and lower portion slots of the device are adapted to mechanically secure the battery compartment cover. Preferably, the accessory 100 is used with the battery compartment cover removed from the hand-held video game device.

The second case member 108 includes a rear wall 114 with two flat tabs 116 extending therefrom. that are adapted to slide into the slots at the top portion of the battery compartment of the hand-held video game device. A detent clip 120 protrudes inwardly from the rear wall 114 and is adapted to snap into the existing slot or groove at the lower portion of the battery compartment of the hand-held video game device.

A tab 124 is slidably mounted to a front wall 128 of the first member 104. of the case 102 and is adapted to slide along an elongated aperture 132. A power jack 136 and an audio connector jack 140 are connected to an internal portion of the tab 124 for simultaneously slidable movement through apertures 144 and 148, respectively, of the first member 104 with corresponding slidable movement of the tab 124. When the accessory 100 is attached to the hand-held video game device, slidable movement of the tab 124 to a completely forward position causes the power jack 136 and an audio connector jack 140 to mate with the external power supply outlet and headphone outlet on the bottom of the hand-held video game device.

Figure 2:
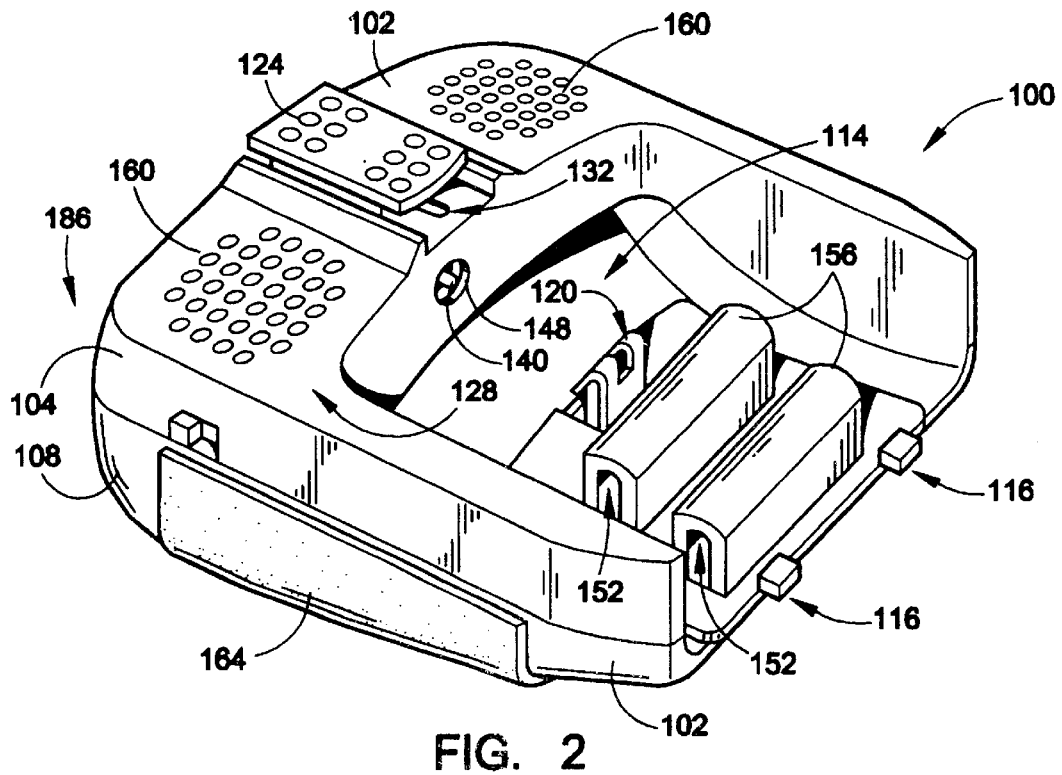
FIG. 2 is a perspective view of an alternative embodiment of an accessory for a hand-held video game device.
Figure 3:
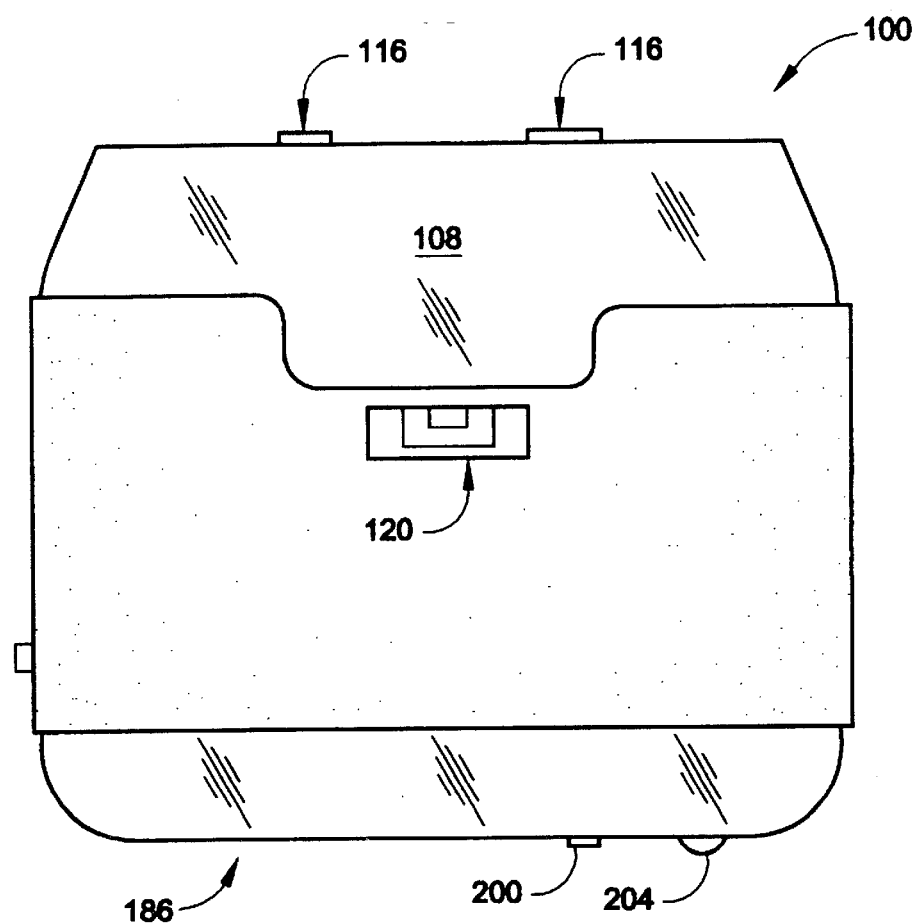
FIG. 3 is a rear side-elevation view of the accessory illustrated in FIG. 1.

With reference to FIG. 2, in an alternative embodiment, a single audio jack 140 adapted to mate with the headphone outlet on the bottom of the hand-held video game device may be connected to the tab 124 for slidable movement therewith. In this embodiment, the accessory 100 may include a pair of electrical contacts 152 mounted to a pair of generally battery-shaped protrusions 156. When the accessory 100 is attached to the hand-held video game device, the pair of generally battery-shaped protrusions 156 replace the batteries in the battery compartment, and the pair of electrical contacts 152 communicate with a corresponding pair of electrical contacts in the battery compartment for electrically coupling a rechargeable battery of the accessory 100 to the hand-held video game device for powering the device.

With reference back to FIG. 1, the case 102 may include speaker holes 160 behind which speakers (not shown) are mounted. The second member 108 of the case 102 may also include an ergonomic rubber grip 164.

A force feed back mechanism is also mounted in the case 102. The force feed back mechanism preferably includes a motor 168 (FIG. 5) with a weight 172 mounted off-center on a motor shaft 176. When the motor 168 is activated, the shaft 176 rotates the off-center weight 172, causing a vibration sensation in the accessory 100. Other force feed back mechanisms may be used. For example, instead of a motor, a solenoid may be used to create the vibration sensation.

Figure 4:
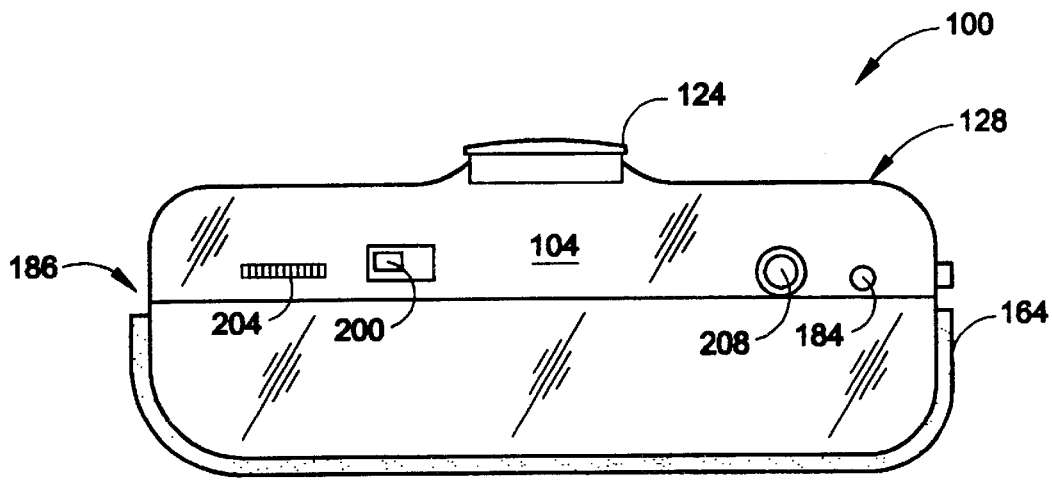
FIG. 4 is a bottom plan view of the accessory illustrated in FIG. 1.
Figure 5:
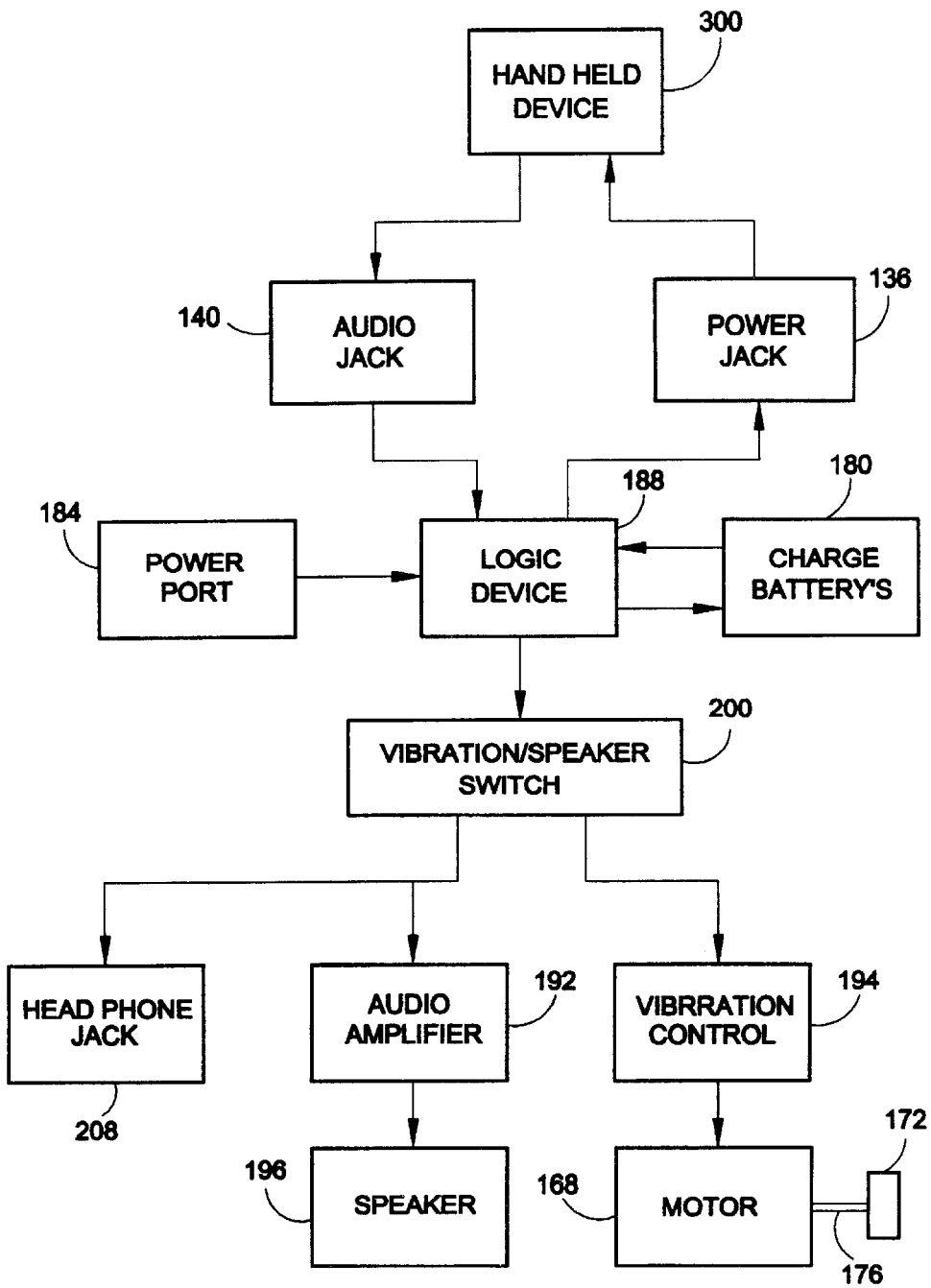
FIG. 5 is a schematic illustration of an embodiment of the components of the accessory illustrated in FIG. 1.

The case 102 also houses a pair of rechargeable batteries 180 (FIG. 5). Although two rechargeable batteries 180 are described, the number of rechargeable batteries 180 may vary. An external power port 184 (FIGS. 4 and 5) located on a bottom 186 (FIG. 4) of the case 102 is in electrical communication with the rechargeable batteries 180 and is adapted to received a jack of an Ac adapter for charging the batteries 180. It will be readily apparent to those skilled in the art that rechargeable or renewable energy sources other than rechargeable batteries may be used. For example, one or more renewable fuel cells may be used.

With reference to FIG. 5, a schematic illustration of an embodiment of the internal components of the accessory 100 is shown. The power port 184 is coupled to a logic device 188, which in turn is coupled to the rechargeable batteries 180. The logic device 188 may regulate the amount of power sent to the rechargeable batteries 180 during recharge and the amount of power distributed during discharge. The logic device 188 may also regulate distribution of power to other components of the accessory 100, and regulate the power provided to the power jack 136.

The logic device 188 is connected to the audio jack 140, and receives audio signals from the hand-held video game device 300 and regulates those signals for output to the force feed back mechanism (depicted in FIG. 5 as motor 168, shaft 176 and weight 172), the audio amplifier 192 and speakers 196. The duration and speed of the motor 168 varies with the length and intensity of the audio signals to create the force feed back felt in the accessory 100, causing the length and intensity of the force feed back to be proportional to the length and intensity of such signals. Increasing the volume of the hand-held video game device 300 increases the movement generated by the force feed back mechanism. A vibration switch 200 on the bottom 186 of the case 102 (FIG. 4) allows the user to turn on and off the vibration feed back and provide vibration without sound. The accessory 100 also includes a vibration sensitivity control switch 204 on the bottom 186 of the case 102 (FIG. 4) electrically connected to the vibration switch 200 and the motor 168. The vibration sensitivity control switch 204 allows the user to adjust the level of vibration for any set level of volume. The vibration sensitivity control switch 204 may include a variable resistor. The accessory 100 further includes a headphone jack 208 located on the bottom 186 of the case 102 (FIG. 4).

The process for connecting the accessory 100 to the device will now be described. The user of the accessory 100 first removes the battery compartment cover of the video game device 300 and removes the batteries from the compartment. The user must also make certain that the accessory's 100 tab 124 (FIG. 1) is slid towards the bottom 186 of the accessory 100 such that the power jack 136 and the audio connector jack 140 do not protrude from the apertures 144 and 148. The user may then place the two flat tabs 116 of the accessory 100 (FIG. 1) into the pair of slots located at the top portion of the battery compartment of the video game device 300 and pivot the accessory 100 about the two flat tabs 116 towards the video game device until the detent clip 120 enters the slot located at the lower portion of the battery compartment. The detent clip 120 should "click", indicating that the clip 120 has entered the slot and is mechanically locked into place. The user may secure the electrical and audio connections by sliding the tab 124 along the elongated aperture 132 away from the bottom 186 of the accessory 100 and towards the video game device, causing the power jack 136 and the audio jack 140 to simultaneously slide through the apertures 144, 140, respectively. Both jacks 136 and 140 will mate with the external power supply outlet and headphone outlet, respectively, on the bottom of the hand-held video game device. This mating of the jacks 136 and 140 with the video game device not only electrically connects the accessory 100 to the device, but also adds further strength to the mechanical connection between the accessory 100 and the device.

The process for connecting the alternate embodiment of the accessory 100 illustrated in FIG. 2 (i.e., without the power jack 136) to the device will now be described. As with the previous method of use, the user should remove the battery compartment cover and batteries from the video game device. The user mechanically connects the accessory 100 to the device using the two flat tabs 116 and the detent clip 120 as described above. When the accessory 100 is mechanically connected to the device, the pair of generally battery-shaped protrusions 156 replace the batteries in the battery compartment, and the pair of electrical contacts 152 communicate with a corresponding pair of electrical contacts in the battery compartment for electrically coupling the rechargeable batteries 180 of the accessory 100 to the hand-held video game device for powering the device. The user connects the audio of the device to the accessory 100 by sliding the tab 124 along the elongated aperture 132 away from the bottom 186 of the accessory 100 and towards the video game device. Sliding the tab 124 causes the audio jack 140 to slide through the aperture 140 and into the headphone outlet on the bottom of the hand-held video game device. The physical connection of the audio jack 140 with the video game device adds further strength to the mechanical connection between the device and the accessory 100 and electrically connects the accessory 100 to the audio of the device.

It will be readily apparent to those skilled in the art that still further changes and modification in the actual concepts described herein can readily be made without departing from the spirit and scope of the invention as defined by the following claims. For example, logic, or variable logic, could be included to control the movement created by the force feed back, by modifying the volume signal received from the game device, or the signal driving the force feed back. Accordingly, the scope of the invention is not intended to be limited except as is required by the lawful scope of the following claims.

What is claimed is:

1. An accessory for a hand-held video game device having an external power supply outlet and a headphone outlet, comprising:

a case mechanically connectable with said hand-held video game device;

a rechargeable battery;

a power jack electrically coupled to the rechargeable battery for insertion into the external power supply outlet of the hand-held video game device for powering said hand-held video game device;

an audio connector jack for insertion into the headphone outlet of the hand-held device for receiving audio signals from said hand-held video game device;

an amplified stereo speaker system to be powered by said rechargeable battery and receive audio signals from said hand-held video game device through the audio connector jack when the audio connector jack is inserted into the headphone outlet; and a vibration mechanism electrically coupled to said rechargeable battery and causing a movement sensation in said accessory, said vibration mechanism actuated by said audio signals.

2. An accessory as recited in claim 1, further comprising at least one switch mechanism to allow a user of said accessory to turn on and turn off said vibration mechanism.

3. An accessory as recited in claim 1, further including a vibration control mechanism to allow a user of said accessory to control the vibration level of said vibration mechanism.

4. An accessory as recited in claim 1, further comprising at least one switch mechanism to allow a user of said accessory to turn on and turn off said amplified stereo speaker system.

5. An accessory as recited in claim 4, further including a volume control mechanism to allow a user of said accessory to control the volume level of said amplified stereo speaker system.

6. An accessory as recited in claim 1, wherein said vibration mechanism includes a motor and a weight that is driven by the motor to cause a vibration sensation in said accessory.

7. An accessory as recited in claim 1, wherein said vibration mechanism includes a solenoid and a weight connect to said solenoid such that when said solenoid is activated the weight is moved to cause a vibration sensation in said accessory.

8. An accessory as recited in claim 1, wherein said vibration mechanism vibrates at a level proportionate to a characteristic of said audio signals.

9. An accessory as recited in claim 1, further comprising an external power supply outlet for electrical communication with an external power source for charging said rechargeable battery.

10. An accessory as recited in claim 1, further comprising a headphone outlet to receive an audio connector jack of a pair of headphones.

11. An accessory as recited in claim 1, wherein said case includes an external ergonomically designed grip for improved control and comfort during game play.

12. An accessory as recited in claim 11, wherein the grip is made of a plastic material.

13. An accessory for a hand-held video game device having a battery compartment with battery contacts, and a headphone outlet, comprising:

a case mechanically connectable with said hand-held video game device;

a rechargeable battery;

at least one electrical contact electrically coupled to the rechargeable battery for contacting the battery contacts of the hand-held video game device for powering said hand-held video game device;

an audio connector jack for insertion into the headphone outlet of the hand-held device for receiving audio signals from said hand-held video game device;

an amplified stereo speaker system powered by said rechargeable battery and receive audio signals from said hand-held video game device through the audio connector jack when the audio connector jack is inserted into the headphone outlet; and a vibration mechanism electrically coupled to said rechargeable battery for causing a movement sensation in said accessory, said vibration mechanism actuated by said audio signals.

14. An accessory as recited in claim 13, further comprising at least one switch mechanism to allow a user of said accessory to turn on and turn off said vibration mechanism.

15. An accessory as recited in claim 13, further including a vibration control mechanism allowing a user of said accessory to control the vibration level of said vibration mechanism.

16. An accessory as recited in claim 13, further comprising at least one switch mechanism allowing a user of said accessory to turn on and turn off said amplified stereo speaker system.

17. An accessory as recited in claim 16, further including a volume control mechanism allowing a user of said accessory to control the volume level of said amplified stereo speaker system.

18. An accessory as recited in claim 13, wherein said vibration mechanism includes a motor and a weight that is driven by the motor to cause a vibration sensation in said accessory.

19. An accessory as recited in claim 13 wherein said vibration mechanism includes a solenoid and a weight connect to said solenoid such that when said solenoid is activated the weight is moved to cause a vibration sensation in said accessory.

20. An accessory as recited in claim 13, wherein said vibration mechanism vibrates at a level proportionate to a characteristic of said audio signals.

21. An accessory as recited in claim 13, further comprising an external power supply outlet for electrical communication with an external power source for charging said rechargeable battery.

22. An accessory as recited in claim 13, further comprising a headphone outlet to receive an audio connector jack of a pair of headphones.

23. An accessory as recited in claim 13, wherein said case includes an external ergonomically designed grip for improved control and comfort during game play.

24. An accessory as recited in claim 23, wherein the grip is made of a plastic material.

25. A method of connecting an accessory to a hand-held video game device, said accessory having an electronics enclosing case, a power jack and an audio connector jack, and said device having an external power supply outlet and a headphone outlet, said method comprising the steps of:

mechanically locking the accessory to the device; and inserting the power and the audio connector jacks of the accessory into the external power supply and the headphone outlets of the device, respectively, to secure electrical and audio connections between the accessory and the device.

26. A method of connecting an accessory to a hand-held video game device, said accessory having an electronics enclosing case, at least one electrical contact to contact a battery contact of the device, and an audio connector jack, and said device having a headphone outlet, said method comprising the steps of:

mechanically locking the accessory to the device;

placing the battery contact of the device in electrical communication with the at least one electrical contact of the accessory; and inserting the audio connector jack of the accessory into the headphone outlet of the device to secure the audio connection between the accessory and the device.

* * * * *